United States Patent Office 3,043,850
Patented July 10, 1962

3,043,850
CHEMICAL COMPOUNDS CONTAINING SULFUR AND SPIROBI (META-DIOXANE) GROUPS
Howard R. Guest, Charleston, Joe T. Adams, St. Albans, and Harry A. Stansbury, Jr., South Charleston, W. Va., assignors to Union Carbide Corporation, a corporation of New York
No Drawing. Original application Sept. 26, 1957, Ser. No. 686,277, now Patent No. 2,996,516, dated Aug. 15, 1961. Divided and this application Apr. 26, 1960, Ser. No. 27,236
3 Claims. (Cl. 260—340.7)

This invention relates to novel spirobi(meta-dioxane) derivatives and their preparation. In one aspect, this invention relates to a method of producing chemical compounds containing spirobi(meta-dioxane) and sulfur groups. In another aspect, this invention relates to chemical compounds containing substituted spirobi(meta-dioxane) and sulfur groups which are useful as intermediate reactants and as accelerators for curing rubber.

This application is a division of application S.N. 686,-277, filed September 26, 1957, now Patent 2,996,516.

It is an object of the present invention to provide a method for producing chemical compounds containing spirobi(meta-dioxane) and sulfur groups.

It is a further object of this invention to provide spirobi-(meta-dioxane)- and sulfur-containing chemical compounds which have active sites that can react under suitable conditions.

Other objects and advantages of the present invention will become apparent to those skilled in the art from the following description.

The compounds according to this present invention are produced by reacting together a 3,9-divinylspirobi(meta-dioxane) compound and a mercaptoalcohol having available at lease one thiol group and one hydroxyl group.

The 3,9-divinylspirobi(meta-dioxane) compounds preferred are those having the formula:

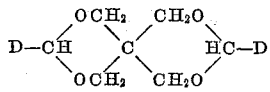

wherein D is selected from the group consisting of (R—CH=CH—) and

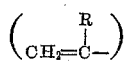

and R is selected from the group consisting of hydrogen, halogen and lower alkyl.

The 3,9-divinylspirobi(meta-dioxane) compounds which are most conveniently and economically prepared from widely available starting materials are those which have hydrogen or a methyl substituted on each vinyl group. The 3,9-divinylspirobi(meta-dioxane) compounds which contain groups other than hydrogen and methyl substituted on the vinyl groups are sometimes more difficult to prepare. These other groups must be of a character and in a position on the vinyl groups not to interfere with the effective reactions of 3,9-divinylspirobi(meta-dioxane) compounds in the process of the present invention.

3,9 - divinylspirobi(meta - dioxane) compounds which contain a terminal methylene group are of particular advantage for ease of reaction, quality of product, etc. Their use, therefore, generally is the most preferred. Substituents on the vinyl groups of a spirobi(meta-dioxane) nucleus may be included to alter the properties of the product compounds and/or to act as reactive sites for chemical transformation of the products under suitable conditions.

The preferred 3,9-divinylspirobi(meta-dioxane) starting materials of this present invention may be prepared by the condensation of a mole of pentaerythritol with two moles of acrolein or an acrolein derivative in the presence of an acid catalyst such as p-toluenesulfonic acid. This well-known synthetic method is published in detail in Schulz and Wagner, Angew. Chemie 62, 118 (1950), and in German Patents 858,406; 870,032 and 885,006.

The 3,9 - divinylspirobi(meta - dioxane) compounds which contain terminal methylene groups are derived from the reaction of pentaerythritol with $\alpha,\beta$-unsaturated aldehyde such as acrolein, alpha-methyl acrolein, alpha-ethyl acrolein, alpha-propyl acrolein, alpha-butyl acrolein, alpha-isobutyl acrolein and the like.

When acrolein is used, an unsubstituted 3,9-divinylspirobi(meta-dioxane) is obtained:

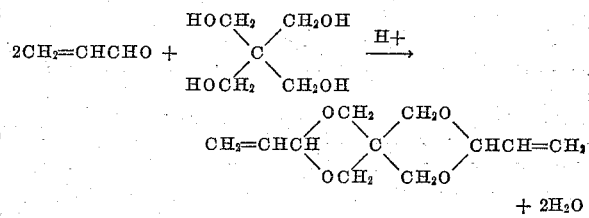

When the condensation is conducted with (a) alpha-methyl acrolein or (b) crotonaldehyde, then methyl-substituted 3,9-divinylspirobi(meta-dioxanes) are obtained:

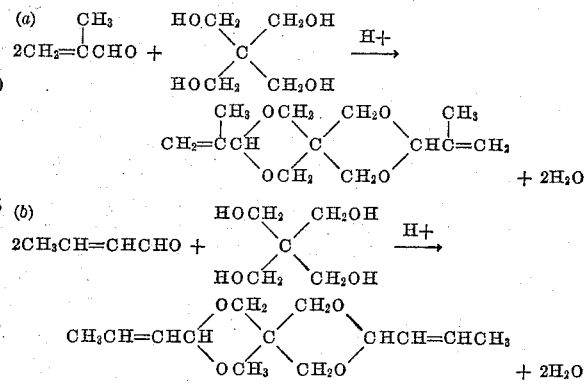

It is not necessary that the $\alpha,\beta$-unsaturated aldehyde reacted with pentaerythritol be pure or a single species. Mixtures of $\alpha,\beta$-unsaturated aldehydes may be condensed with pentaerythritol for purposes of convenience and economy. The resulting products are mixtures of 3,9-divinylspirobi(meta-dioxane) compounds which may be used in their crude form directly in the processes of this invention.

The mercaptoalcohols that are useful in this invention are those which contain at least one thiol group and one hydroxyl group and not more than 10 carbon atoms. The wide variety of mercaptoalcohols that may be reacted with 3,9-divinylspirobi(meta-dioxane) compounds can be illustrated by a representative group comprising monothio-ethyleneglycol (2-mercaptoethanol); monothiodiethylene-glycol; 2-mercapto-1-propanol; 1-thioglycerol; 1,2-dithioglycerol; 1,3-dithioglycerol; 3-ethoxy-1,2-dimercaptopropane; 1-chloro-2-hydroxy-3-mercaptopropane; 2-mercaptoimidazoethanol; mercaptophenol; dimercaptophenol; trimercaptophenol; and trimercaptoresorcinol.

Mercaptoalcohols are easily synthesized either by the reaction of an alkylene oxide with hydrogen sulfide or by the reaction of a haloalcohol with a metal mercaptan. Epoxy alcohols and epoxy halides also may be converted to mercaptoalcohols.

The reaction of a mercaptoalcohol and a 3,9-divinyl-spirobi(meta-dioxane) compound proceeds well under moderate conditions. The reaction temperature may vary between about room temperature and 200° C., with a preferred temperature range being between 90° and 120°

C. Atmospheric pressure is satisfactory for most of the reactions, or autogenous pressure if the reaction is conducted in a closed system. Either batchwise or continuous methods may be employed. The reaction time may vary between about 0.1 and 20 hours depending on the nature of the reactants and on the reaction conditions.

The mole ratio of mercaptoalcohol to 3.9-divinyl-spirobi(meta-dioxane) may vary between 5 moles of mercaptoalcohol to each mole of spirobi compound, and 0.5 mole of mercaptoalcohol to each mole of spirobi compound. An excess of mercaptoalcohol compound favors a simple addition product, while an excess of 3,9-divinylspirobi(meta-dioxane) increases the possibility of a polymerization reaction, the latter being especially true at higher temperatures and in the presence of an acid catalyst such as p-toluenesulfonic acid, sulfuric acid, and zinc chloride.

A solvent is not ordinarily necessary, but if it is desired one may be employed, e.g., benzene, dioxane, tetrahydrofuran, ethyleneglycol diether ether, dibutyl ether, heptane, dimethylformamide, and the like. A solvent may be preferable when an inorganic acid catalyst is being used.

An illustration of the production of the novel compounds of this invention is the reaction of 1,3-dithioglycerol with 3,9-($\alpha,\alpha'$-dimethyl)divinylspirobi(metadioxane) under conditions which favor polymerization:

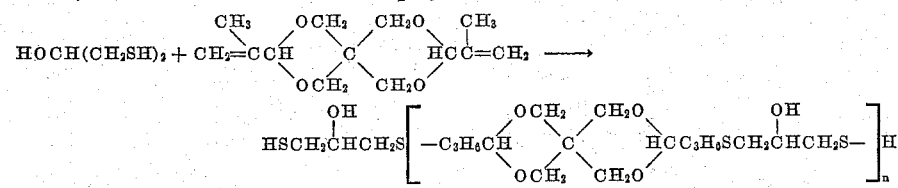

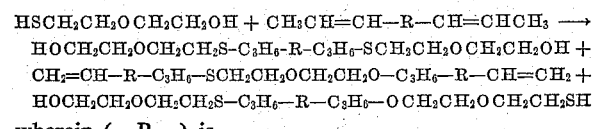

Another illustration is the reaction of monothiodiethyleneglycol with 3,9-($\beta,\beta'$-dimethyl)divinylspirobi(meta-dioxane) under conditions which yield addition products:

$HSCH_2CH_2OCH_2CH_2OH + CH_3CH=CH-R-CH=CHCH_3 \longrightarrow$
$HOCH_2CH_2OCH_2CH_2S-C_3H_6-R-C_3H_6-SCH_2CH_2OCH_2CH_2OH +$
$CH_2=CH-R-C_3H_6-SCH_2CH_2OCH_2CH_2O-C_3H_6-R-CH=CH_2 +$
$HOCH_2CH_2OCH_2CH_2S-C_3H_6-R-C_3H_6-OCH_2CH_2OCH_2CH_2SH$ wherein (—R—) is

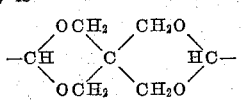

The mercaptoalcohol reactants described in this invention have at least two functional positions, i.e., a thiol group and a hydroxyl group. As mentioned previously, simple addition or polymerization may occur. When only one mercaptan group is present in the mercaptoalcohol then addition reactions predominate. When two or more mercaptan groups are present then polymerization may be induced more easily. This is due to the difference in reactivity of the hydroxyl group and the mercaptan group. The hydroxyl group is a weaker base than the mercaptan group, i.e., the mercaptan group is more nucleophilic than the hydroxyl group, hence, a mercaptan group more readily forms a bond with an electron-deficient carbon atom than does a hydroxyl group.

From the foregoing description it is apparent that complex product mixtures may result from the reaction of a mercaptoalcohol with a 3,9-divinylspirobi(meta-dioxane). The potential or actual variety of products is due to the polyfunctionality of the reactants, and also due to the fact that there are two modes of addition to each of the vinyl groups in the spirobi(meta-dioxane) compound which increases the number of possible isomers.

The products of this invention have wide application in the chemical field. The unique properties exhibited by these sulfur-containing spirobi(meta-dioxane) derivatives make them applicable as accelerators for curing rubber and as intermediates for the production of other chemicals. The reactive sites, e.g., hydroxyl, mercaptan, sulfide, acetal, etc., make the compounds susceptible to chemical transformation.

The properties of these liquid and solid sulfur-containing compounds can be imparted to other materials such as natural and synthetic polymers and elastomers by mixture or combination of the sulfur-containing compounds with said materials.

The following examples will serve to illustrate particular embodiments of this invention.

EXAMPLE 1

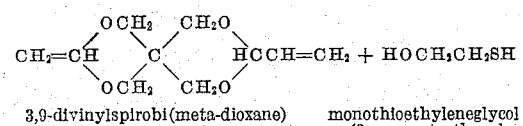

3,9-divinylspirobi(meta-dioxane)     monothioethyleneglycol
(2-mercaptoethanol)

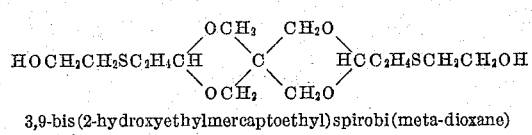

3,9-bis(2-hydroxyethylmercaptoethyl)spirobi(meta-dioxane)

A mixture of 3,9-divinylspirobi(meta-dioxane) (42 grams, 0.2 mole) and monothioethyleneglycol (31 grams, 0.4 mole) were introduced into a glass reaction flask equipped with a stirrer and a reflux condenser and heated at a temperature of 120° C. for one hour. The reaction mixture components which were volatile at a temperature of 200° C./0.5 mm. were removed by distillation, and a residual product (66 grams) was obtained which had $n_D^{30}$ 1.5364, a molecular weight of 350 by the Menzies-Wright method (theory for product formula above: 368), and 103.1% purity[1] by analytical phthalation (determines both hydroxyl and thiol groups). An analysis of thiol groups by oxidation with iodine was performed and it indicated that 32.8% by weight of the product was 3,9 - bis(2 - mercaptoethoxyethyl)spirobi(meta-dioxane). These results show that about two-thirds of the double bonds in the divinyl compounds added the thiol group and approximately one-third added the hydroxyl group.

EXAMPLE 2

90% 3,9-divinylspirobi(meta-dioxane) (236 grams, 1.0 mole) and p-toluenesulfonic acid catalyst (1.0 gram) were placed in a glass reaction flask equipped with a stirrer, feed tank and reflux condenser and heated at a temperature of 90°–95° C. with stirring. Monothioethylleneglycol (156 grams, 2 moles) was added to the mixture over a period of thirty minutes. After a reaction time of seven hours at a temperature of 95° C., the acid catalyst was neutralized by the addition of anhydrous sodium acetate (3.0 grams), and the reaction mixture components which were volatile at a kettle temperature of 89° C./3 mm. were removed by distillation to yield a residual product (345 grams) which had a molecular weight of 401 by the Menzies-Wright method.

EXAMPLE 3

This example illustrates the effective use of a product of this invention as an accelerator for the vulcanization of natural rubber.

---

[1] Percentages slightly higher than one hundred are not unusual results for some analytical procedures.

*Formulations Compounded 5 Minutes at 75° to 90° C. on a Two-Roll Mill*

(a) 100 grams natural rubber (smoked sheet)
1 gram "Age Rite" powder
5 grams zinc oxide
2 grams sulfur
3 grams stearic acid
50 grams "Kosmobile 77EPC" carbon black.

(b) Same as (a) except 1 gram of the product described in Example 2 was added.

Both (a) and (b) were cured (vulcanized) for 60 minutes at 140° C. in 5¼ inch positive molds. The cured compositions had the following properties:

|  | (a) | (b) |
|---|---|---|
| Tensile, p.s.i. | 380 | 1,200 |
| Elongation, percent | 375 | 420 |
| Load at 300% elongation, p.s.i. | 200 | 675 |
| Hardness, Durometer A | 14 | 45 |
| ASTM Stiffness Modulus, p.s.i. | (*) | 6,700 |

*Too soft and flexible for testing.

Having described our invention, we claim:

1. A process for producing resins containing sulfur and spirobi(meta-dioxane) groups which comprises reacting a 3,9-divinylspirobi(meta-dioxane) compound with a mercaptoalkanol having between two and ten carbon atoms and having at least one reactive thiol group and at least one reactive hydroxyl group at a temperature between 30° C. and 150° C. in the presence of an acid catalyst, at a molar ratio of 3,9-divinylspirobi(meta-dioxane) compound to mercaptoalkanol of at least one said 3,9-divinylspirobi(meta-dioxane) compound having the formula:

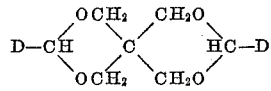

wherein D is selected from the group consisting of (R—CH=CH—) and

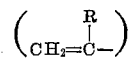

and R is selected from the group consisting of hydrogen, halogen and lower alkyl.

2. The process of claim 1 wherein said 3,9-divinylspirobi(meta-dioxane) compound is 3,9-divinylspirobi-(meta-dioxane) and said mercaptoalkanol is 2-mercaptoethanol.

3. The resins produced by the process of claim 1.

No references cited.